US007495605B1

(12) United States Patent
Sakamoto et al.

(10) Patent No.: US 7,495,605 B1
(45) Date of Patent: Feb. 24, 2009

(54) RADAR APPARATUS

(75) Inventors: Mai Sakamoto, Konan (JP); Kazuma Natsume, Obu (JP); Yasuyuki Miyake, Nisshin (JP)

(73) Assignee: DENSO Corporation, Kariya (JP)

( * ) Notice: Subject to any disclaimer, the term of this patent is extended or adjusted under 35 U.S.C. 154(b) by 227 days.

(21) Appl. No.: 11/497,033

(22) Filed: Jul. 31, 2006

(30) Foreign Application Priority Data

Aug. 2, 2005 (JP) ............................. 2005-224636

(51) Int. Cl.
*G01S 13/08* (2006.01)
(52) U.S. Cl. ...................................... 342/118; 342/147
(58) Field of Classification Search ................. 342/108
See application file for complete search history.

(56) References Cited

U.S. PATENT DOCUMENTS 6,121,917 A      9/2000  Yamada
6,646,589 B2 *  11/2003  Natsume ...................... 342/70
2001/0015698 A1 *  8/2001  Tokoro ........................ 342/70
2003/0052813 A1 *  3/2003  Natsume ...................... 342/70

* cited by examiner

*Primary Examiner*—Thomas H Tarcza
*Assistant Examiner*—Timothy A Brainard
(74) *Attorney, Agent, or Firm*—Harness, Dickey & Pierce, PLC

(57) ABSTRACT

A radar apparatus includes a receiving means that receives a reflected signal, a beat signal generation means that generates beat signals based on the reflected signal, a correlation matrix generation means that calculates correlation matrices based on the beat signals, a storing means that stores previous correlation matrices, an addition means that calculates addition correlation matrices by adding the correlation matrices to the previous correlation matrices, a detection means that detects a frequency component satisfying a predetermined condition by using the beat signals, an extraction means that extracts an extraction matrix corresponding to the detected frequency from the addition correlation matrices, and a direction calculation means that calculates a direction of the object with respect to the radar apparatus based on the extraction matrix.

14 Claims, 7 Drawing Sheets

FIG. 3A
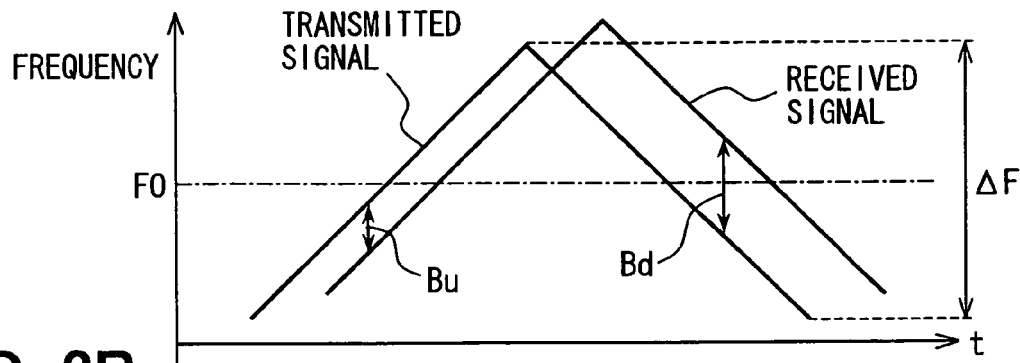
FIG. 3B
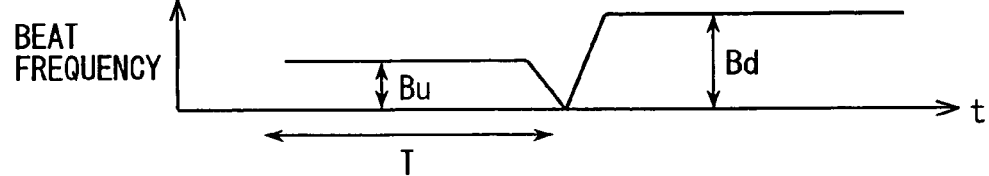
FIG. 6
| | | CALCULATION | |
|---|---|---|---|
| | | R±R | R×R |
| FORM | CORRELATION MATRIX | 500 | 500 |
| | EIGENVECTOR | 3500 | 3500 |
| | MUSIC SPECTRUM | 6500 | 6500 |

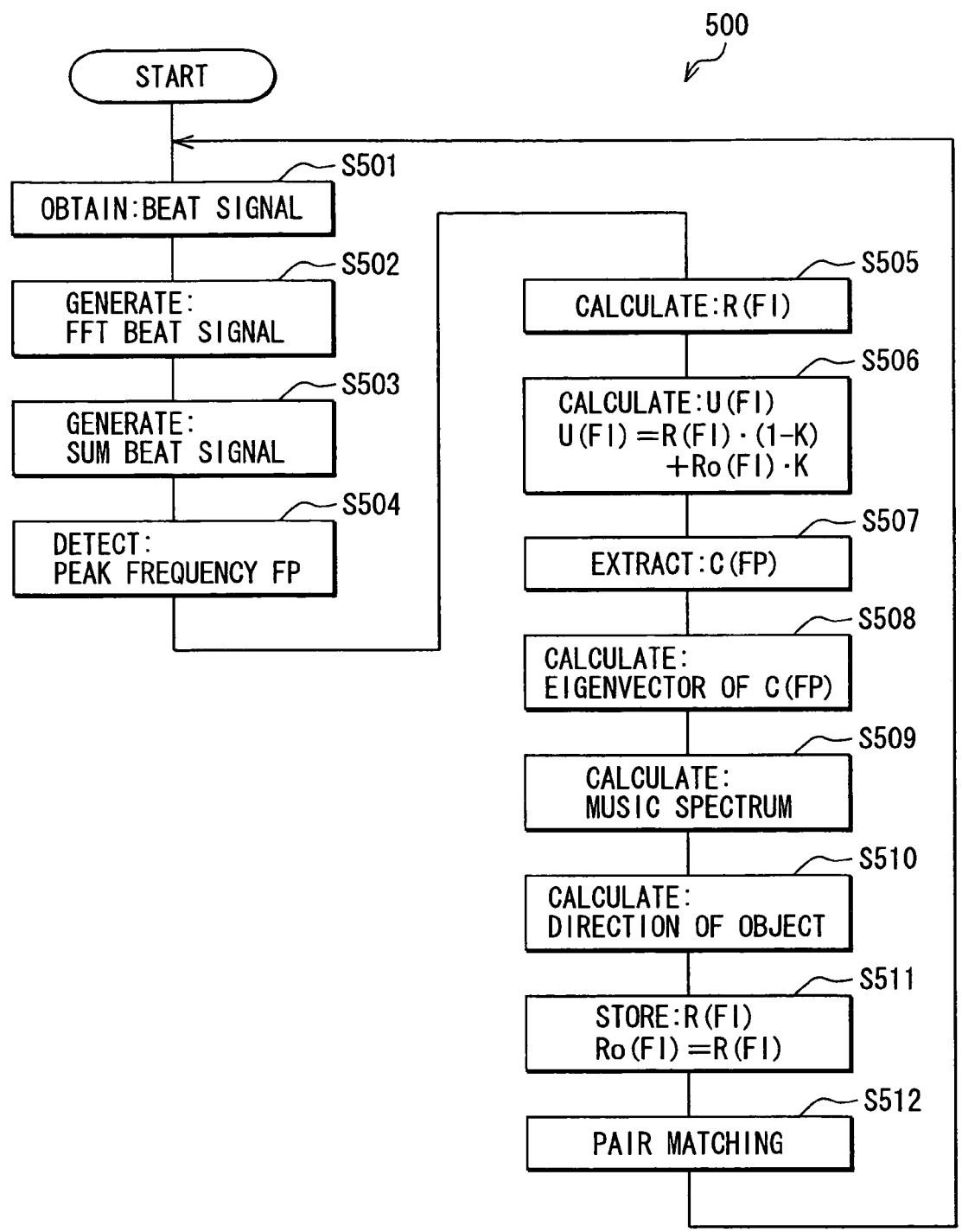

RADAR APPARATUS

CROSS REFERENCE TO RELATED APPLICATION

This application is based on and incorporates herein by reference Japanese Patent Application No. 2005-224636 filed on Aug. 2, 2005.

FIELD OF THE INVENTION

The present invention relates to a radar apparatus.

BACKGROUND OF THE INVENTION

There are various types of radar apparatus for detecting a distance and a direction of an object with respect to the radar apparatus. A frequency modulated continuous wave (FMCW) radar apparatus is a radar apparatus that continuously transmits a frequency-modulated radar signal to the object and detects the distance or a relative velocity of the object based on the transmitted radar signal reflected from the object.

In one method for detecting the direction of the object, a transmitting means for transmitting a radar signal mechanically turns and scans the transmitted radar signal reflected from the object. In another method that uses a digital beam forming (DBF) algorithm, the transmitting means is fixed and an antenna having multiple elements arranged in an array receives the transmitted radar signal. The received radar signal is digitally processed and the direction of the object is detected based on the digital signal. Specifically, in the DBF algorithm, an angular spectrum is generated based on the received radar signal on each of the elements and a peak of the angular spectrum is detected. The direction of the object is estimated based on the peak of the angular spectrum.

In a beamformer algorithm as the DBF algorithm, the angular spectrum is generated such that amplitudes of the received signal at a given time are connected as shown in FIGS. 10A and 10B. A multiple signal classification (MUSIC) algorithm is known as a high-resolution direction of arrival (DOA) estimation algorithm.

In the DOA estimation algorithm, correlation matrices are calculated, eigenvalue expansions are performed on each of the correlation matrices, the angular spectrum is calculated from eigenvectors of the correlation matrices, and the direction of the object is calculated based on the angular spectrum.

A FMCW radar apparatus disclosed in U.S. Pat. No. 6,121,917 corresponding to JP-A-H11-133142 detects the direction of the object by using the beamformer algorithm. In the FMCW radar apparatus, a fast Fourier transform (FFT) is applied to the received wave signal to obtain a peak frequency of a distance power spectrum. Then, the beamformer algorithm is applied to only the peak frequency component of the received signal so that the amount of calculation required to detect the direction of the object is reduced.

However, when the beamformer algorithm is used in the radar apparatus, resolution of the radar apparatus depends on the number of elements arranged in the array. Therefore, the radar apparatus using the beamformer algorithm needs to be increased in size to obtain high resolution.

The high-resolution DOA estimation algorithm such as the MUSIC algorithm achieves the high resolution without an increase in the number of the elements. In the DOA estimation algorithm, the resolution may be increased by reducing noise with summation of the received signal with respect to time. The summation is performed such that a present angular spectrum calculated in a present process and a previous angular spectrum calculated in a previous process are summed up.

However, when the object moves, a frequency corresponding to the distance changes between in the previous process and in the present process. Therefore, the DOA estimation algorithm needs to be applied to all the frequency components of the received signal on each process to calculate the angular spectrum, and the calculated angular spectrum needs to be stored in a memory. The calculation of the angular spectrum requires an eigenvalue expansion that requires a lot of calculation. Therefore, when the angular spectrum is calculated on each frequency component, the amount of calculation is significantly increased. In the DOA estimation algorithm, the high resolution results in a significant increase in the amount of calculation.

SUMMARY OF THE INVENTION

In view of the above-described problem, it is an object of the present invention to provide a radar apparatus that achieves a high resolution without a significant increase in the amount of calculation.

A radar apparatus uses a DOA estimation algorithm performed at a predetermined time interval to detect an object. The radar apparatus includes a transmitting means that transmits a wave signal to the object, a receiving means that receives the transmitted wave signal reflected from the object, a beat signal generation means that generates a plurality of beat signals based on the received wave signal, a correlation matrix generation means that calculates a plurality of correlation matrices based on the beat signals with respect to each frequency component of the beat signals, an addition means that calculates a plurality of addition correlation matrices, a storing means that stores at least a portion of a plurality of previous correlation matrices calculated by the correlation matrix generation means at a previous time, a detection means that detects at least one frequency component of the beat signals, the frequency component satisfying a predetermined condition, an extraction means that extracts an extraction matrix from the addition correlation matrices, the extraction matrix corresponding to a frequency component closest to the frequency component detected by the detection means, and a direction calculation means that calculates a direction of the object with respect to the radar apparatus based on the extraction matrix. The receiving means includes a plurality of elements arranged in an array and each of the beat signals generated by the beat signal generation means corresponds to each of the elements. The addition means calculates the addition correlation matrices by adding the correlation matrices calculated by the correlation matrix generation means to the previous correlation matrices stored by the storing means.

In a conventional DOA estimation algorithm, correlation matrices are generated from beat signals. Then, angular spectrums are calculated from each eigenvector of each of the correlation matrices. The storing means stores the angular spectrums as previous information and the angular spectrums are used in a next process to reduce noise.

In the DOA estimation algorithm used in the radar apparatus, a position of the object (i.e., a frequency component indicating a presence of the object) is estimated from the beat signals and then an angular spectrum corresponding to the position is calculated. Correlation matrices calculated in a present process and previous correlation matrices calculated in a previous process are summed up to reduce noise. In the radar apparatus, therefore, the storing means stores the correlation matrices as the previous information, not the angular spectrums.

For example, in a MUSIC algorithm, the amount of calculation required to calculate the correlation matrices is about one-thirteenth the amount of calculation required to calculate MUSIC spectrums. Because the radar apparatus uses the correlation matrices instead of the angular spectrums to reduce the noise, a significant increase in the amount of calculation can be prevented. Thus, the radar apparatus achieves a high resolution without the significant increase in the amount of calculation.

BRIEF DESCRIPTION OF THE DRAWINGS

The above and other objectives, features and advantages of the present invention will become more apparent from the following detailed description made with reference to the accompanying drawings. In the drawings:

FIGS. 3A and 3B are diagrams showing a principal of beat signals generated in the radar apparatus of FIG. 1;

FIG. 5 is a flow chart illustrating a process performed by a microcomputer of the radar apparatus of FIG. 1;

FIG. 6 is a table showing the amount of calculation performed by the microcomputer of the radar apparatus of FIG. 1;

DETAILED DESCRIPTION OF THE PREFERRED EMBODIMENTS

First Embodiment

Figure 1:
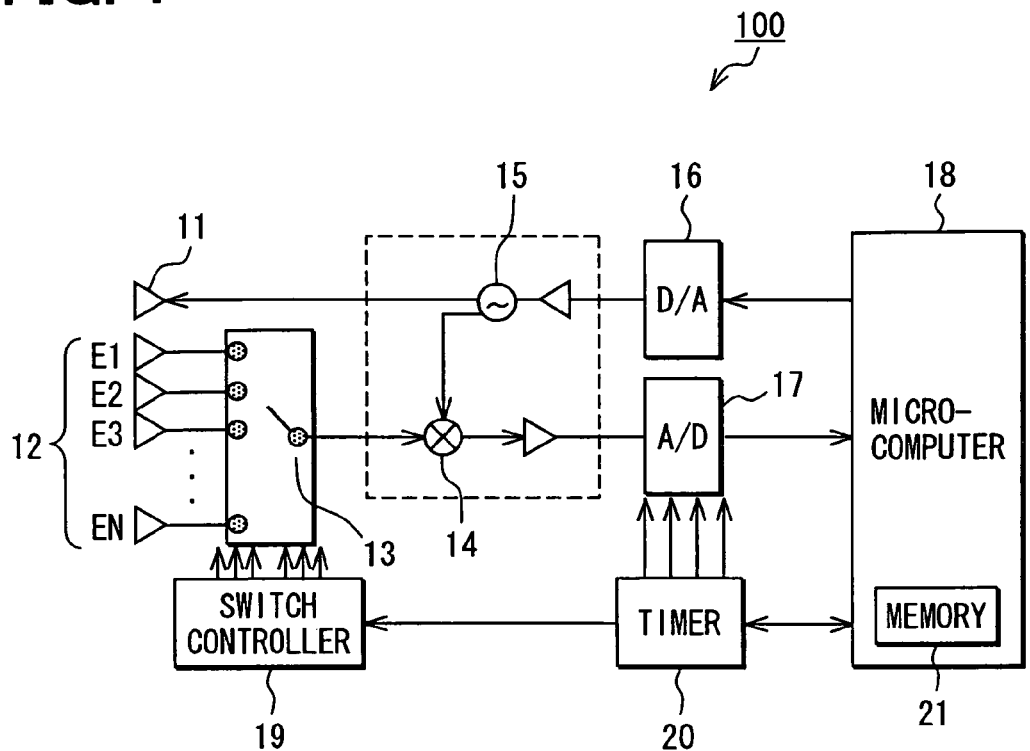
FIG. 1 is a block diagram showing a radar apparatus according to a first embodiment of the present invention.

A radar apparatus 100 according to a first embodiment of the present invention will now be described with FIGS. 1 to 5. The radar apparatus 100 includes a transmitting antenna 11, a receiving antenna 12 having N elements E1-EN arranged in an array, where N is a positive integer, a high-frequency switch 13, a mixer 14, an oscillator 15, a digital-to-analog (D/A) converter 16, an analog-to-digital (A/D) converter 17, a microcomputer 18, a switch controller 19, and a timer 20.

The microcomputer 18 outputs a digital transmit signal to the D/A converter 16. The D/A converter 16 converts the digital transmit signal into an analog transmit signal and outputs the analog transmit signal to the oscillator 15. The oscillator 15 outputs the analog transmit signal to the transmitting antenna 11 at a predetermined frequency. The transmitting antenna 11 converts the analog transmit signal into a radar signal and transmits the radar signal to an object.

The receiving antenna 12 receives the transmitted radar signal reflected from the object. The received radar signal is converted into an analog receive signal on each of the elements E1-EN. The high-frequency switch 13 in turn sends the analog receive signal to the mixer 14. In the mixer 14, the analog receive signal is mixed with the analog transmit signal to generate a beat signal on each of the elements E1-EN. The beat signal is input to the A/D converter 17 and converted into a digital receive signal. The digital signal is input to the microcomputer 18.

The microcomputer 18 controls the high-frequency switch 13 through the switch controller 19 and controls a sampling rate of the A/D converter 17 though the timer 20. The microcomputer 18 has a memory 21.

The microcomputer 18 performs a distance calculation process for calculating the distance between the radar apparatus 100 and the object and a direction calculation process for calculating the direction between the radar apparatus 100 and the object.

Figure 2:
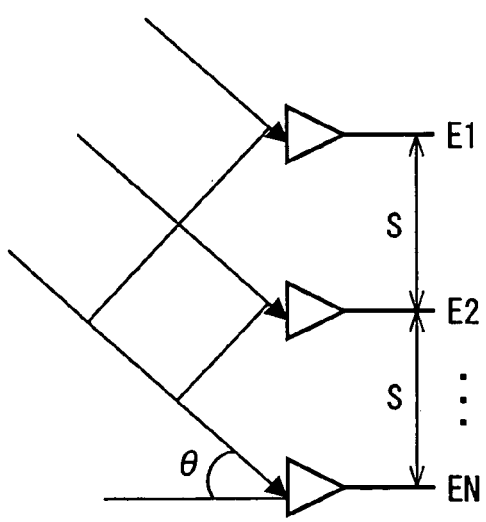
FIG. 2 is an arrangement of elements of a receiving antenna of the radar apparatus of FIG. 1.

Referring to FIGS. 2 and 3, the distance calculation process is described.

As shown in FIG. 2, the elements E1-EN of the receiving antenna 12 are spaced from each other by a predetermined spacing S.

There arises a time delay and a frequency shift between the transmitted radar signal, which is frequently modulated by the oscillator 15, and the received radar signal. The time delay corresponds to the distance between the radar apparatus 100 and the object, and the frequency shift corresponds to a relative velocity between the radar apparatus 100 and the object. A phase shift of the received radar signal with respect to the transmitted radar signal increases with the distance between the radar apparatus 100 and the object. The distance and relative velocity between the radar apparatus 100 and the object can be detected based on the phase shift. Therefore, a beat signal is calculated as a frequency difference between the transmitted radar signal and the received radar signal.

As shown in FIGS. 3A and 3B, the beat signal has a first beat frequency Bu in an increase area where the frequency of the transmitted radar signal increases, and has a second beat frequency Bd in a decrease area where the frequency of the transmitted radar signal decreases. Thus, the beat signal includes a first beat signal having the first beat frequency Bu and a second beat signal having the second beat frequency Bd.

When the receiving antenna 12 has the elements E1-EN, the beat signal is generated on each of the elements E1-EN. In the whole receiving antenna 12, therefore, 2N beat signals are generated. Specifically, N first beat signals having the first beat frequency Bu and N second beat signals having the second beat frequency Bd are generated.

The distance and the relative velocity between the radar apparatus 100 and the object are given by the following equations:

$$D = \{C \cdot T/(4 \cdot \Delta F)\} \cdot (BuH + BdH) \quad (1)$$

$$V = \{C/(4 \cdot F0)\} \cdot (BuH - BdH) \quad (2)$$

In the above equations (1) (2), D represents the distance, V represents the relative velocity, C represents the speed of light, $\Delta F$ represents a frequency range of the transmitted radar signal, and F0 represents the center of the $\Delta F$. BuH is the first beat signal generated based on the received radar signal that is received by the element EH, where H is a positive integer less than or equal to N (i.e., $1 \leq H \leq N$). BdH is the second beat signal generated based on the received radar signal that is received by the element EH.

Figure 4A:
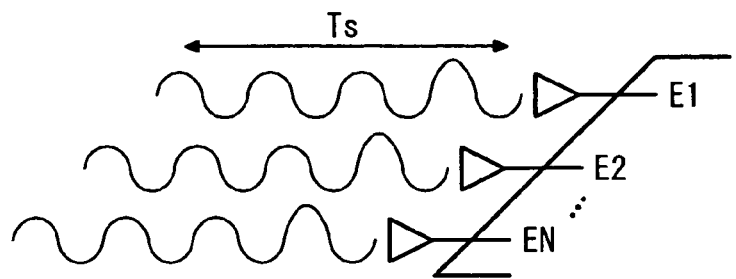
FIG. 4A is a diagram showing a reflected wave signal received by the elements of the receiving antenna of the radar apparatus of FIG. 1.
Figure 4B:
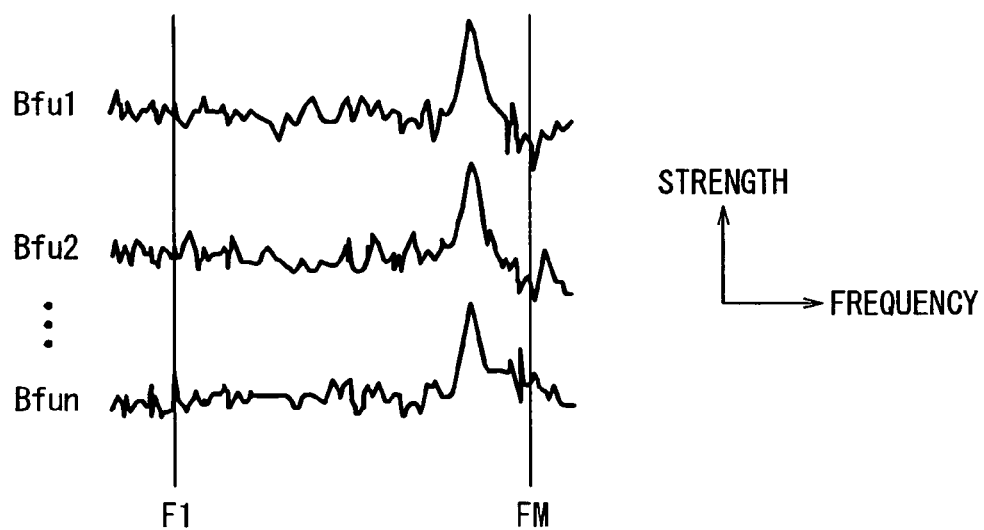
FIG. 4B is FFT beat signals generated by applying a FFT to beat signals of FIG. 3B.
Figure 4C:
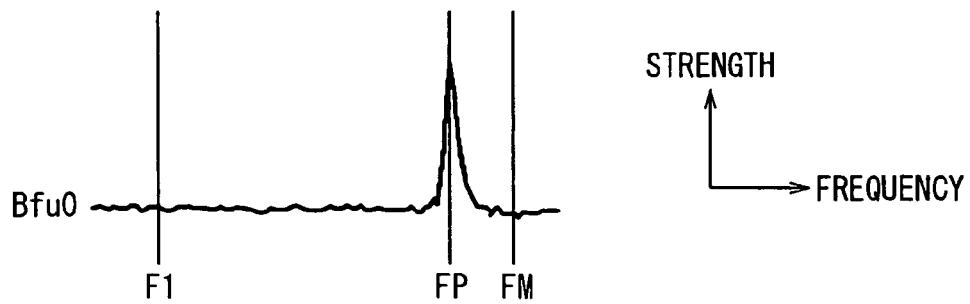
FIG. 4C is a diagram showing a sum beat signal into which the FFT beat signals of FIG. 4B are summed.

Referring to FIGS. 4A-4C, the direction calculation process is described. The microcomputer 18 performs the direction calculation process at a predetermined time interval Ts.

First, a fast Fourier transform (FFT) is applied to each of the N beat signals Bu1-BuN to generate N FFT beat signals Bfu1-BfuN. Likewise, the fast Fourier transform (FFT) is applied to the N beat signals Bd1-BdN to generate N FFT beat signals Bfd1-BfdN. Although only the FFT beat signals Bfu1-BfuN are illustrated in FIG. 4B, the FFT beat signals Bfd1-BfdN are processed in the same way as the FFT beat signals Bfu1-BfuN.

Next, a correlation matrix group RG of correlation matrices are generated by using each of the FFT beat signals. For example, in the case of FIG. 4B, the correlation matrix group RG includes M correlation matrices R(F1)-R(FM), where M is a positive integer greater than 1. A correlation matrix R(FI) corresponds to a frequency FI, where I is a positive integer less than or equal to M (i.e., $1 \leq I \leq M$). When the receiving antenna 12 has the elements E1-EN, each of the correlation matrices R(F1)-R(FM) is an N×N matrix.

As described later, an addition correlation matrix group UG having addition correlation matrices U(F1)-U(FM) is generated such that the correlation matrix group RG generated in a present process is added to a previous correlation matrix group RoG that is the correlation matrix group RG generated in a previous process (i.e., Ts earlier) and stored in the memory 21. The addition correlation matrix group UG has less noise than the correlation matrix group RG. The use of the previous correlation matrix group RoG as previous information reduces the noise.

A MUSIC algorithm used in the radar apparatus 100 is described below. The MUSIC algorithm allows the radar apparatus 100 to achieve the high resolution without an increase in the amount of calculation.

The FFT beat signals Bfu1-BfuN shown in FIG. 4B are summed up to generate a sum beat signal Bfu0 shown in FIG. 4C. As can be seen from FIG. 4C, the sum beat signal Bfu0 has less noise than each of the FFT beat signals Bfu1-BfuN. Likewise, the FFT beat signals Bfd1-BfdN are summed up to generate a sum beat signal Bfd0 having less noise than each of the FFT beat signals Bfd1-BfdN.

When the received radar signal contains a reflected wave from the object, each of the sum beat signals Bfu0, Bfd0 has peak strength. For example, in FIG. 4C, the sum beat signal Bfu0 has the peak strength at a frequency FP, where P is a positive integer less than or equal to M. The peak frequency FP is detected and an extraction matrix C(FP), which is an addition correlation matrix U(FP) corresponding to the peak frequency FP, is extracted from the addition correlation matrices U(F1)-U(FM) of the addition correlation matrix group UG.

Referring to FIG. 5, a process 500 including the distance calculating process and the direction calculating process is described. Although the beat signals Bu1-BuN are only discussed below, the beat signals Bd1-BdN are processed in the same way as the beat signals Bu1-BuN. The microcomputer 18 performs the process 500 as an interrupt process at the predetermined time interval Ts.

The process 500 starts with step S501, where the microcomputer 18 obtains the beat signals Bu1-BdN.

Then, the process 500 proceeds to step S502, where the FFT is applied to each of the beat signals Bu1-BdN to generate the FFT beat signals Bfu1-BfuN.

Then, the process 500 proceeds to step S503, where the FFT beat signals Bfu1-BfuN are summed into the sum beat signal Bfu0.

Then, the process 500 proceeds to step S504, where the peak frequency FP of the sum beat signal Bfu0 is detected.

Then, the process 500 proceeds to step S505, where the correlation matrix group RG having the correlation matrices R(F1)-R(FM) is calculated from the FFT beat signals Bu1-BdN generated in step S502.

Then, the process 500 proceeds to step S506, where each of the correlation matrices R(F1)-R(FM) of the correlation matrix group RG is multiplied by a weighting factor (1-K) and each of correlation matrices Ro(F1)-Ro(FM) of the previous correlation matrix group RoG is multiplied by a weighting factor K, where K is a fixed value between 0.0 and 1.0. As described above, the previous correlation matrix group RoG is the correlation matrix group RG that is generated in a previous loop (i.e., Ts earlier) of the process 500. Then, the correlation matrix group RG multiplied by the weighting factor (1-K) and the previous correlation matrix group RoG multiplied by the weighting factor K are added together to produce the addition correlation matrix group UG having addition correlation matrices U(F1)-U(FM). Therefore, the addition correlation matrix U(FI), i.e., each of the addition correlation matrices U(F1)-(FM) of the addition correlation matrix group UG is given by:

$$U(FI) = R(FI) \cdot (1-K) + Ro(FI) \cdot K \tag{3}$$

Then, the process 500 proceeds to step S507, where the extraction matrix C(FP) is extracted from the addition correlation matrix group UG. The extraction matrix C(FP) is the addition correlation matrices U(FP) corresponding to the peak frequency FP detected in step S504, Then, the process 500 proceeds to step S508, where an eigenvalue expansion of the extraction matrix C(FP) is performed.

Then, the process 500 proceeds to step S509, where a MUSIC spectrum is calculated based on an eigenvector of the extraction matrix C(FP).

Then, the process 500 proceeds to step S510, where the direction of the object in the increase area is calculated based on the MUSIC spectrum. Because the beat signals Bd1-BdN are processed in the same way as the beat signals Bu1-BuN, the direction of the object in the decrease area is also calculated.

Then, the process 500 proceeds to step S511, where the correlation matrix group RG generated in step S505 is stored in the memory 21 as the previous correlation matrix group RoG that is used in a next loop of the process 500.

Then, the process 500 proceeds to step S512, where pair matching of the object is performed based on the strength of the sum beat signal Bfu0, the direction of the object in the increase area, the strength of the sum beat signal Bfd0, and the direction of the object in the decrease area. Thus, the distance and the relative velocity between the radar apparatus 100 and the object are detected.

After step S512 is finished, the process 500 returns to step S501.

The correlation matrix group RG generated in a present loop of the process 500 is added to the previous correlation matrix group RoG that is generated in the previous loop of the process 500 and stored in the memory 21. In such an approach, the addition correlation matrix group UG can have less noise than the correlation matrix group RG.

The peak frequency FP, which indicates the presence of the object, is detected and the extraction matrix C(FP) corresponding to the peak frequency FP is extracted from the additional correlation matrix group UG. The MUSIC spectrum is generated by using the extraction matrix C(FP). Specifically, the eigenvalue expansion is performed on only the extraction matrix C(FP) to generate the MUSIC spectrum. Therefore, the amount of calculation executed by the microcomputer 18 is very small, as compared to when the eigenvalue expansion is performed on each of the addition correlation matrices U(F1)-U(FM).

The previous information is stored in the memory 21 in the form of the correlation matrix for the following reason.

FIG. 6 is a table showing the amount of calculation for converting the FFT beat signals Buf0-BufN into each form per frequency (i.e., one of the frequencies F1-FM). In the table, R±R represents an addition/subtraction of real numbers and R×R represents a multiplication of real numbers.

As show in the table, 500 addition/subtractions and 500 multiplications are required to calculate one of the correlation matrices R(F1)-R(FM) from the FFT beat signals Bfu1-BfuN. Likewise, 3500 addition/subtractions and 3500 multiplications are required to calculate the eigenvectors of one of the correlation matrices R(F1)-R(FM) from the FFT beat signals Bfu1-BfuN. In other words, 3000 addition/subtractions and 3000 multiplications are required to calculate the eigenvectors from one of the correlation matrices R(F1)-R(FM).

In the case of FIG. 4, 500×M addition/subtractions and 500×M multiplications are performed to calculate the correlation matrices R(F1)-R(FM) from the FFT beat signals Bfu1-BfuN. For example, when the number M is 10, 50000 addition/subtractions and 50000 multiplications are performed to calculate the 10 correlation matrices R(F1)-R(F10) from the FFT beat signals Bfu1-BfuN.

If the memory 21 stores the eigenvectors of each of the correlation matrices R(F1)-R(FM), 3000×M addition/subtractions and 3000×M multiplications are further performed to calculate the eigenvectors. However, the eigenvector of the correlation matrix R(FP) corresponding to the peak frequency FP is only used to generate the extraction matrix C(FP). Therefore, when the peak frequency in the previous loop is equal to that in the present loop, 3000×(M−1) addition/subtractions and 3000×(M−1) multiplications are wasted. Likewise, when the peak frequency in the previous loop is not equal to that in the present loop, 3000×(M−2) addition/subtractions and 3000×(M−2) multiplications are wasted.

In view of the amount of calculation, therefore, it is appropriate that the previous information should be stored in the memory 21 in the form of the correlation matrices R(F1)-R(FM).

Thus, the radar apparatus 100 achieves the high resolution without the increase in the amount of calculation.

Although the case where one object is detected is discussed in the first embodiment, the radar apparatus 100 can detect two or more objects.

For example, when the number of the objects is two and the distance between one object and the radar apparatus 100 is not equal to that between the other object and the radar apparatus 100, the sum beat signal Bfu0 has two peak strengths, i.e., two peak frequencies. In this case, two extraction matrices C(FP), one of which corresponds to one peak frequency and the other of which corresponds to the other peak frequency, are extracted from the additional correlation matrix group UG. The MUSIC spectrums are calculated based on each of the two extraction matrices C(FP) so that each direction of the two objects can be detected.

In contrast, when the distance between one object and the radar apparatus 100 is equal to that between the other object and the radar apparatus 100, the sum beat signal Bfu0 has only one peak strength. In this case, one extraction matrix C(FP) corresponding to the peak frequency is extracted from the additional correlation matrix group UG. The MUSIC spectrum is calculated based on the extraction matrix C(FP). Because the MUSIC spectrum contains signals indicating each direction of the two objects, i.e., the MUSIC spectrum has two peaks, each direction of the two objects can be detected.

Second Embodiment

Figure 7:
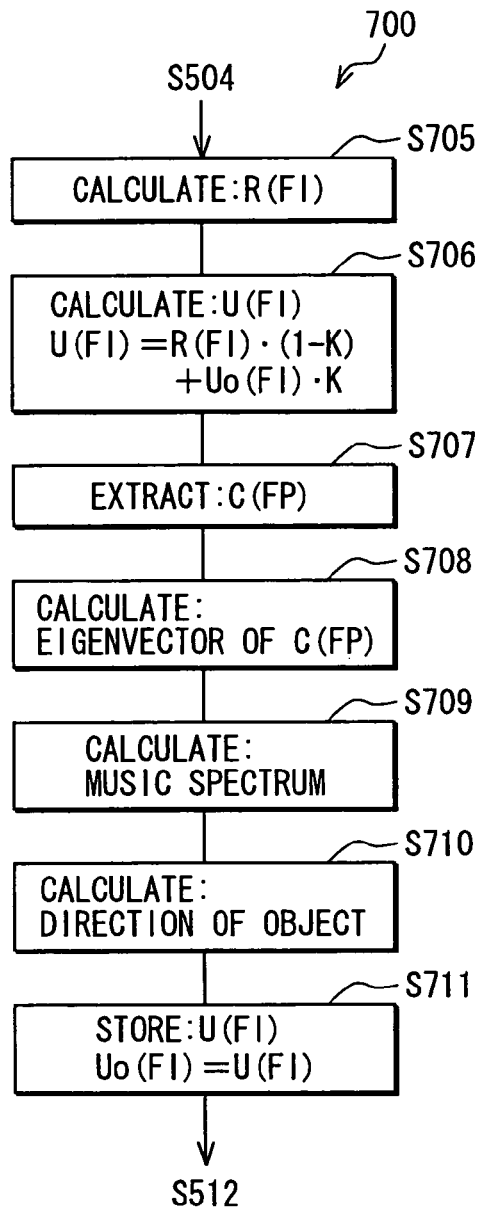
FIG. 7 is a flow chart illustrating a process performed by a microcomputer of a radar apparatus according to a second embodiment of the present invention.

Referring to FIGS. 5 and 7, a second embodiment of the present invention is described. In the second embodiment, the microcomputer 18 performs a process 700 shown in FIG. 7 instead of the process 500 shown in FIG. 5. As shown in FIG. 7, the process 700 includes steps S705-S711 instead of steps S505-S511 of the process 500. Although the beat signals Bu1-BuN are only discussed below, the beat signals Bd1-BdN are processed in the same way as the beat signals Bu1-BuN.

After steps S501-S504 are finished, the process 700 proceeds to step S705, where the correlation matrix group RG having the correlation matrices R(F1)-R(FM) is calculated from the FFT beat signals Bfu1-BfuN generated in step S502.

Then, the process 700 proceeds to step S706, where each of the correlation matrices R(F1)-R(FM) of the correlation matrix group RG is multiplied by the weighting factor (1-K) and each of previous addition correlation matrices Uo(F1)-Uo(FM) of a previous correlation matrix group UoG is multiplied by a weighting factor K. The previous correlation matrix group RoG is the addition correlation matrix group UG generated in a previous loop (i.e., Ts earlier) of the process 700. Then, the correlation matrix group RG multiplied by the weighting factor (1-K) and the previous addition correlation matrix group UoG multiplied by the weighting factor K are added together to produce the addition correlation matrix group UG having the addition correlation matrices U(F1)-U(FM). Therefore, the addition correlation matrix U(FI), i.e., each of the addition correlation matrices U(F1)-(FM) of the addition correlation matrix group UG is given by:

$$U(FI)=R(FI)\cdot(1-K)+Uo(FI)\cdot K \qquad (4)$$

Then, the process 700 proceeds to step S707, where the extraction matrix C(FP) is extracted from the addition correlation matrix group UG. The extraction matrix C(FP) is the addition correlation matrices U(FP) corresponding to the peak frequency FP detected in step S504.

Then, the process 700 proceeds to step S708, where the eigenvalue expansion of the extraction matrix C(FP) is performed.

Then, the process 700 proceeds to step S709, where the MUSIC spectrum is calculated based on the eigenvector of the extraction matrix C(FP).

Then, the process 700 proceeds to step S710, where the direction of the object in the increase area is calculated based on the MUSIC spectrum. Because the beat signals Bd1-BdN are processed in the same way as the beat signals Bu1-BuN, the direction of the object in the decrease area is also calculated.

Then, the process 700 proceeds to step S711, where the addition correlation matrix group UG generated in step S706 is stored in the memory 21 as the previous addition correlation matrix group UoG that is used in a next loop of the process 700.

Then, the process 700 proceeds to step S512.

In the process 700, thus, the previous additional correlation matrix UoG generated in the previous loop is used to generate the addition correlation matrix group UG. In such an approach, the addition correlation matrix UG can be generated based on two or more previous correlation matrix groups so that the addition correlation matrix group UG of the second embodiment can have less noise than that of the first embodiment.

Third Embodiment

Figure 8:
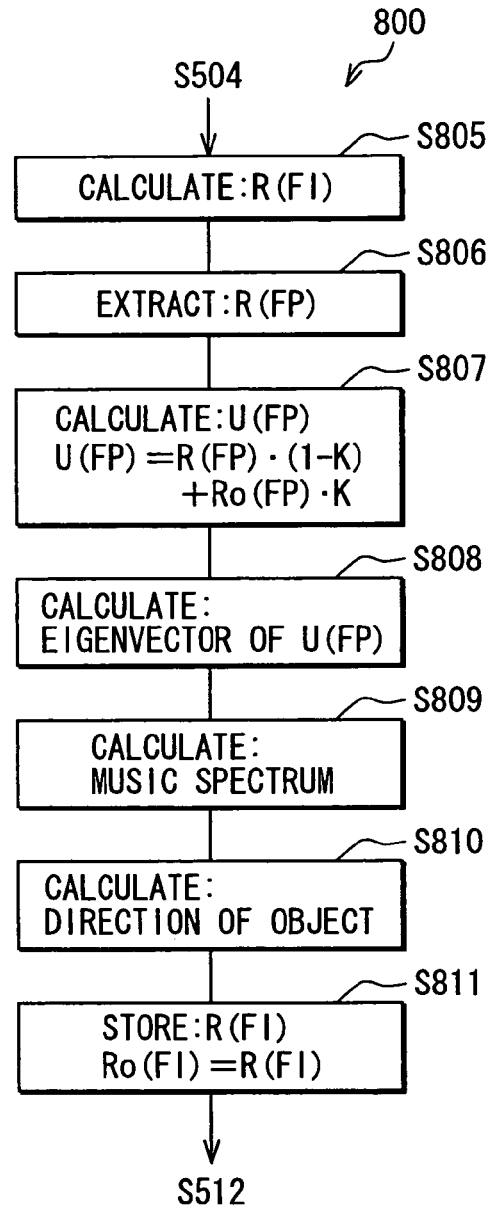
FIG. 8 is a flow chart illustrating a process performed by a microcomputer of a radar apparatus according to a third embodiment of the present invention.

Referring to FIGS. 5 and 8, a third embodiment of the present invention is described. In the third embodiment, the microcomputer 18 performs a process 800 shown in FIG. 8 instead of the process 500 shown in FIG. 5. As shown in FIG. 8, the process 800 includes steps S805-S811 instead of steps S505-S511 of the process 500. Although the beat signals Bu1-BuN are only discussed below, the beat signals Bd1-BdN are processed in the same way as the beat signals Bu1-BuN.

After steps S501-S504 are finished, the process 800 proceeds to step S805, where the correlation matrix group RG having the correlation matrices R(F1)-R(FM) is calculated from the FFT beat signals Bfu1-BfuN generated in step S502.

Then, the process 800 proceeds to step S806, where a correlation matrix R(FP) corresponding to the peak frequency FP detected in step S504 is extracted from the correlation matrix group RG. Further, a previous correlation matrix Ro(FP) corresponding to the peak frequency FP is extracted from a previous correlation matrix group RoG having correlation matrices Ro(F1)-Ro(FM). The previous correlation matrix group RoG is the correlation matrix group RG that is generated in a previous loop (i.e., Ts earlier) of the process 800 and stored in the memory 21.

Then, the process 800 proceeds to step S807, where the correlation matrix R(FP) is multiplied by the weighting factor (1-K) and the previous correlation matrix Ro(FP) is multiplied by the weighting factor K. Then, the correlation matrix R(FP) multiplied by the weighting factor (1-K) and the previous correlation matrix Ro(FP) multiplied by the weighting factor K are added together to produce the addition correlation matrix U(FP). Therefore, the addition correlation matrix U(FP) is given by:

$$U(FP) = R(FP) \cdot (1-K) + Ro(FP) \cdot K \quad (5)$$

Then, the process 800 proceeds to step S808, where the eigenvalue expansion of the addition correlation matrix U(FP) is performed.

Then, the process 800 proceeds to step S809, where the MUSIC spectrum is calculated based on the eigenvector of the addition correlation matrix U(FP).

Then, the process 800 proceeds to step S810, where the direction of the object in the increase area is calculated based on the MUSIC spectrum. Because the beat signals Bd1-BdN are processed in the same way as the beat signals Bu1-BuN, the direction of the object in the decrease area is also calculated.

Then, the process 800 proceeds to step S811, where the correlation matrix group RG generated in step S805 is stored in the memory 21 as the previous correlation matrix group RoG that is used in a next loop of the process 800.

Then, the process 800 proceeds to step S512.

In the process 500 according to the first embodiment, the addition correlation matrix group UG having the addition correlation matrices U(F1)-U(FM) is generated such that the correlation matrix group RG is added to the previous correlation matrix group RoG. When the number of the objects is one, the sum beat signal Bfu0 has only one peak frequency. Therefore, although each of the addition correlation matrices U(F1)-U(FM) is calculated, the addition correlation matrix U(FP) corresponding to the peak frequency FP is only used. In other words, the calculation of the addition correlation matrices U(F1)-U(FM) except for the addition correlation matrix U(FP) may result in waste. In contrast, in the process 800 according to the third embodiment, the addition correlation matrix U(FP) is generated such that the correlation matrix R(FP) is added to the previous correlation matrix Ro(FP). Thus, the wasted calculation can be avoided.

In the process 500, the memory 21 needs to store the previous correlation matrix group RoG and the addition correlation matrix group UG at the same time. In contrast, in the process 800, the memory 21 needs to store the previous correlation matrix group RoG and the addition correlation matrix U(FP) at the same time. Therefore, the memory 21 can have a small amount of storage capacity in the process 800, as compared to in the process 500.

Fourth Embodiment

A fourth embodiment of the present invention is described. In the third embodiment, the memory 21 stores each of the M correlation matrices R(F1)-R(FM) for the next loop. In contrast, in the fourth embodiment, the memory 21 stores M/2 correlation matrices R(F1), R(F3), R(F5) .... Thus, the M correlation matrices R(F1)-R(FM) are thinned out to the M/2 correlation matrices R(F1), R(F3), R(F5) .... In other words, the M correlation matrices R(F1)-R(FM) are alternately stored in the memory 21 such that the memory 21 stores the M/2 correlation matrices R(F1), R(F3), R(F5) ....

For example, when the correlation matrices R(F1)-R(F3) are generated in the Sth loop, where S is a positive integer, the memory 21 stores the correlation matrices R(F1), R(F3) as the previous correlation matrices Ro(F1), Ro(F3). In other words, the correlation matrix R(F2) is not stored in the memory 21 in the Sth loop. In this case, if the peak frequency FP is F2 in the (S+1)th loop, the previous correlation matrix Ro(F2) is generated such that a weighted average of the previous correlation matrix Ro(F1) is added to a weighted average of the previous correlation matrix Ro(F3).

Figure 9:
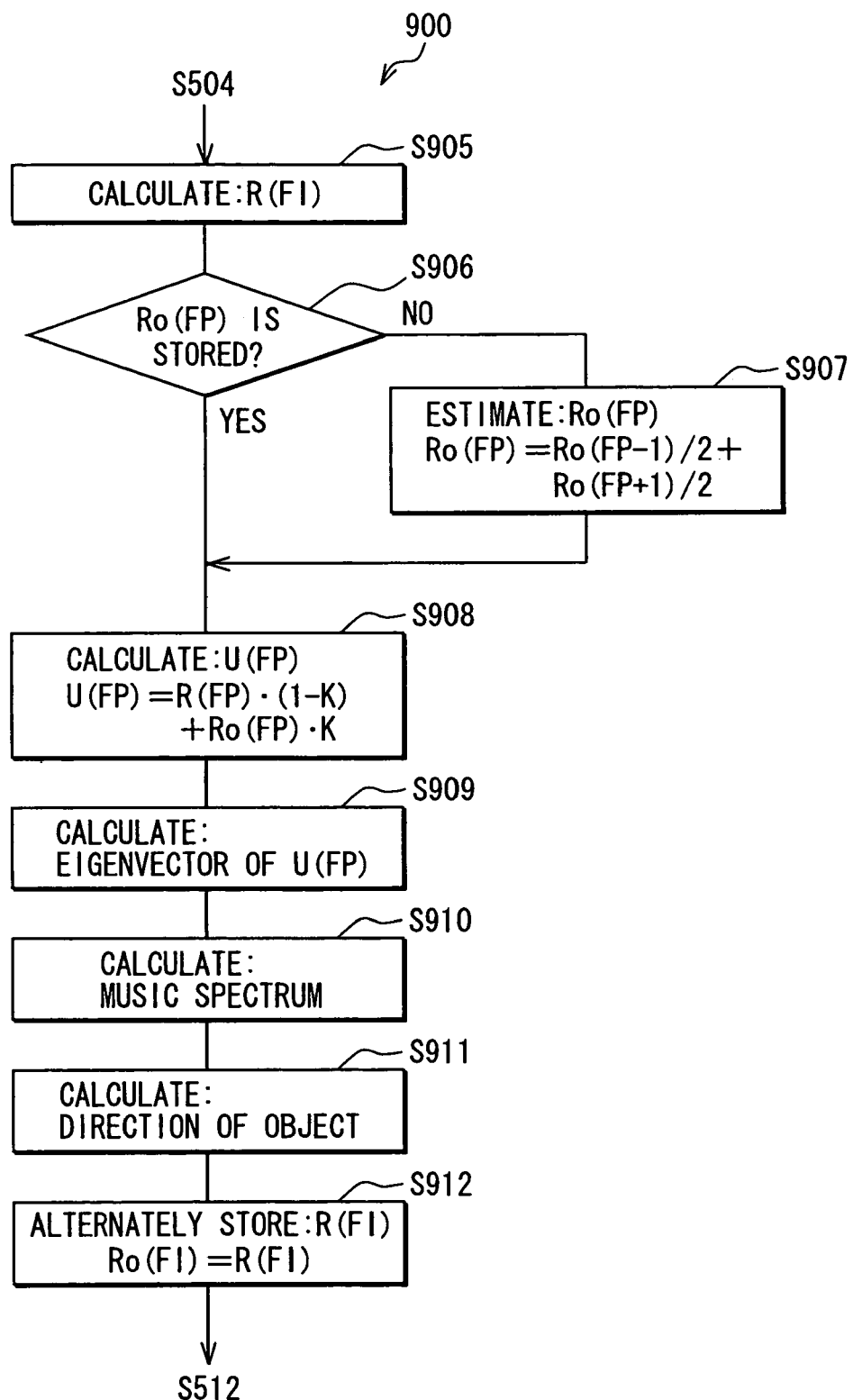
FIG. 9 is a flow chart illustrating a process performed by a microcomputer of a radar apparatus according to a fourth embodiment of the present invention.
Figure 10A:
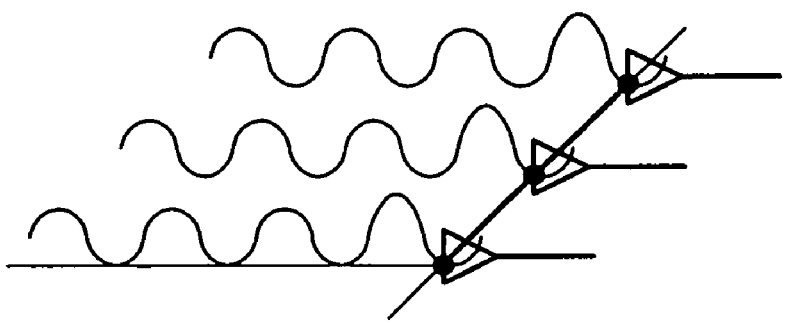
FIG. 10A is a diagram showing an angular spectrum generated when reflected wave signals arrive at elements from a front direction in a beam former method.
Figure 10B:
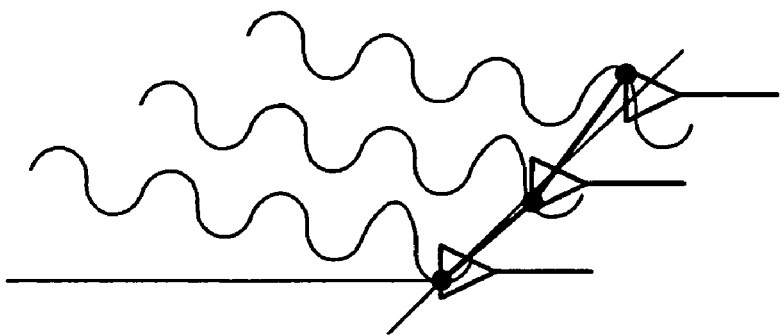
FIG. 10B is a diagram showing the angular spectrum generated when the reflected wave signals arrive at the elements from an oblique direction in the beam former method.

In the fourth embodiment, the microcomputer 18 performs a process 900 shown in FIG. 9 instead of the process 500 shown in FIG. 5. As shown in FIG. 9, the process 900 includes steps S905-S912 instead of steps S505-S511 of the process 500. Although the beat signals Bu1-BuN are only discussed below, the beat signals Bd1-BdN are processed in the same way as the beat signals Bu1-BuN.

After steps S501-S504 are finished, the process 900 proceeds to step S905, where the correlation matrix group RG having the correlation matrices R(F1)-R(FM) is calculated from the FFT beat signals Bfu1-BfuN generated in step S502.

Then, the process 900 proceeds to step S906, where it is determined whether the previous correlation matrix Ro(FP) corresponding to the peak frequency FP is stored in the memory 21.

If the previous correlation matrix Ro(FP) is stored in the memory 21, the process 900 proceeds to step S908 directly.

If the previous correlation matrix Ro(FP) is not stored in the memory 21, the process 900 proceeds to step S908 through step S907, where the previous correlation matrix Ro(FP) is generated such that a weighted average of a previous correlation matrix Ro(FP-1) is added to a weighted average of a previous correlation matrix Ro(FP+1).

At step S908, the correlation matrix R(FP) corresponding to the peak frequency FP is extracted from the correlation matrix group RG. The correlation matrix R(FP) is multiplied by the weighting factor (1-K) and the previous correlation matrix Ro(FP) is multiplied by the weighting factor K. Then, the correlation matrix R(FP) multiplied by the weighting factor (1-K) and the previous correlation matrix Ro(FP) multiplied by the weighting factor K are added together to produce the addition correlation matrix U(FP). Therefore, the addition correlation matrix U(FP) is given by:

$$U(FP)=R(FP)\cdot(1-K)+Ro(FP)\cdot K \qquad (6)$$

Then, the process 900 proceeds to step S909, where the eigenvalue expansion of the addition correlation matrix U(FP) is performed.

Then, the process 900 proceeds to step S910, where the MUSIC spectrum is calculated based on the eigenvector of the addition correlation matrix U(FP).

Then, the process 900 proceeds to step S911, where the direction of the object in the increase area is calculated based on the MUSIC spectrum. Because the beat signals Bd1-BdN are processed in the same way as the beat signals Bu1-BuN, the direction of the object in the decrease area is also calculated.

Then, the process 900 proceeds to step S912, where the correlation matrix group RG is thinned out and stored in the memory 21 as the previous correlation matrix group RoG that is used in a next loop of the process 900.

Then, the process 900 proceeds to step S512.

As described above, in the process 900, the correlation matrix group RG is thinned out and stored in the memory 21 as the previous correlation matrix group RoG. Thus, the memory 21 can have a small amount of storage capacity in the process 900, as compared to in the process 800 according to the third embodiment. Even when the previous correlation matrix Ro(FP) is not stored in the memory 21, the previous correlation matrix Ro(FP) is estimated from previous correlation matrices Ro(FP-1), Ro(FP+1).

(Modifications)

The embodiments described above may be modified in various ways. For example, the radar apparatus 100 may use the received radar signal received by some of the elements E1-EN of the receiving antenna 12, not each of the elements E1-EN. In such an approach, the amount of calculation can be reduced.

The correlation matrix group RG or the addition correlation matrix group UG may be stored in the memory 21 after being compressed by a data compression algorithm. Thus, the memory 21 may store the previous information in a form of data containing elements of the correlation matrix group RG or the addition correlation matrix group UG.

The weighting factor K may be a variable. For example, when the received radar signal has considerable instantaneous noise, the weighing factor K may be increased. In such an approach, an influence of the noise can be reduced.

The algorithm used in the present invention can be applied to various types of the DOA estimation algorithms such as unitary-MUSIC algorithm, ESPRIT algorithm, unitary-ESPRIT algorithm, Capon algorithm, and Beam Former algorithm. In particular, when the unitary-MUSIC or the unitary-ESPRIT is used, only the real part of the matrix is stored in the memory 21. Therefore, the amount of calculation can be significantly reduced and the memory 21 can have a very small amount of storage capacity. The algorithm used in the present invention also can be applied to a spatial smoothing algorithm.

The previous information (i.e., the previous correlation matrix group RoG, or the previous addition correlation matrix group UG) may be generated in two or more previous loop.

For example, the previous information may be generated in two previous loop (i.e., generated 2Ts earlier).

The transmitting antenna 11 instead of the receiving antenna 12 may have the elements arranged in the array to generate the beat signals.

What is claimed is:

1. A radar apparatus that uses a direction of arrival estimation algorithm performed at a predetermined time interval to detect an object, the radar apparatus comprising:

transmitting means for transmitting a wave signal to the object;

receiving means for receiving the transmitted wave signal reflected from the object;

beat signal generation means for generating a plurality of beat signals based on the received wave signal;

correlation matrix generation means for calculating a plurality of correlation matrices based on the beat signals with respect to each frequency component of the beat signals;

addition means for calculating a plurality of addition correlation matrices;

storing means for storing at least a portion of a plurality of previous correlation matrices calculated by the correlation matrix generation means at a previous time, or that stores at least a portion of a plurality of previous addition correlation matrices calculated by the addition correlation matrix generation means at the previous time, the addition means calculating the addition correlation matrices by adding the correlation matrices calculated by the correlation matrix generation means to the previous correlation matrices or the previous addition correlation matrices stored by the storing means;

detection means for detecting at least one frequency component of the beat signals, the frequency component satisfying a predetermined condition;

extraction means for extracting an extraction matrix from the addition correlation matrices, the extraction matrix corresponding to a frequency component closest to the frequency component detected by the detection means; and direction calculation means for calculating a direction of the object with respect to the radar apparatus based on the extraction matrix, wherein the transmitting means or the receiving means includes a plurality of elements arranged in an array, and each of the beat signals generated by the beat signal generation means corresponds to each of the elements.

2. The radar apparatus according to claim 1, wherein the receiving means includes the elements arranged in the array.

3. The radar apparatus according to claim 1, wherein the transmitting means includes the elements arranged in the array.

4. The radar apparatus according to claim 1, wherein the storing means stores the previous correlation matrices, and the addition means calculates the addition correlation matrices by adding the correlation matrices to the previous correlation matrices.

5. The radar apparatus according to claim 4, wherein the addition means further includes a multiplication means that multiplies the correlation matrices by a first weighting factor and the previous correlation matrices by a second weighting factor, and the addition means calculates the addition correlation matrices by adding the correlation matrices multiplied by the first weighting factor to the previous correlation matrices multiplied by the second weighting factor.

6. The radar apparatus according to claim 4, wherein
the previous correlation matrices includes a first portion and a second portion,
the storing means stores the first portion of the previous correlation matrices, and
the addition means further includes estimation means for estimating the second portion of the previous correlation matrices from the first portion to calculate the addition correlation matrices.

7. The radar apparatus according to claim 1, wherein
the storing means stores the previous addition correlation matrices, and
the addition means calculates the addition correlation matrices by adding the correlation matrices to the previous addition correlation matrices.

8. The radar apparatus according to claim 7, wherein
the addition means further includes multiplication means for multiplying the correlation matrices by a first weighting factor and the previous addition correlation matrices by a second weighting factor, and
the addition means calculates the addition correlation matrices by adding the correlation matrices multiplied by the first weighting factor to the previous addition correlation matrices multiplied by the second weighting factor.

9. The radar apparatus according to claim 7, wherein
the previous addition correlation matrices includes a first portion and a second portion,
the storing means stores the first portion of the previous addition correlation matrices, and
the addition means further includes estimation means for estimating the second portion of the previous addition correlation matrices from the first portion to calculate the addition correlation matrices.

10. A radar apparatus that uses a direction of arrival estimation algorithm performed at a predetermined time interval to detect an object, the radar apparatus comprising:
transmitting means for transmitting a wave signal to an object;
receiving means for receiving the transmitted wave signal reflected from the object;
beat signal generation means for generating a plurality of beat signals based on the received wave signal;
correlation matrix generation means for calculating a plurality of correlation matrices based on the beat signals with respect to each frequency component of the beat signals;
storing means for storing at least a portion of a plurality of previous correlation matrices that are calculated by the correlation matrix generation means at a previous time;
detection means for detecting at least one frequency component of the beat signals, the frequency component satisfying a predetermined condition;
extraction means for extracting an extraction matrix from the correlation matrices, and that extracts a previous extraction matrix from the previous correlation matrices stored by the storing means, each of the extraction matrix and the previous extraction matrix corresponding to the frequency component detected by the detection means;
addition means for calculating an addition extraction matrix by adding the extraction matrix to the previous extraction matrix; and
direction calculation means for calculating a direction of the object with respect to the radar apparatus based on the addition extraction matrix, wherein
the transmitting means or the receiving means includes a plurality of elements arranged in an array, and
each of the beat signals generated by the beat signal generation means corresponds to each of the elements.

11. The radar apparatus according to claim 10, wherein
the receiving means includes the elements arranged in the array.

12. The radar apparatus according to claim 10, wherein
the transmitting means includes the elements arranged in the array.

13. The radar apparatus according to claim 10, wherein
the addition means further includes multiplication means for multiplying the extraction matrix by a first weighting factor and the previous extraction matrix by a second weighting factor, and
the addition means calculates the addition extraction matrix by adding the extraction matrix multiplied by the first weighting factor to the previous extraction matrix multiplied by the second weighting factor.

14. The radar apparatus according to claim 10, wherein
the previous correlation matrices includes a first portion and a second portion,
the storing means stores the first portion of the previous correlation matrices, and
the extraction means further includes estimation means for estimating the second portion of the previous correlation matrices from the first portion to extract the previous extraction matrix corresponding to the frequency component detected by the detection means.

* * * * *